United States Patent [19]

Peterson et al.

[11] Patent Number: 5,114,091

[45] Date of Patent: May 19, 1992

[54] DUAL REEL CORD TAKE-UP DEVICE

[76] Inventors: Edwin R. Peterson, 1647 Sendero La., Boise, Id. 83706; Edwin L. Wheeler, 5105 Tinker St., Boise, Id. 83709

[21] Appl. No.: 532,648

[22] Filed: Jun. 4, 1990

[51] Int. Cl.$^5$ .......................................... B65H 75/48
[52] U.S. Cl. .......................................... 242/107.11
[58] Field of Search ................ 242/107.11, 107.12, 242/100.1, 107.1

[56] References Cited

U.S. PATENT DOCUMENTS

| | | | |
|---|---|---|---|
| 452,799 | 5/1891 | Matteson | 242/107.11 |
| 1,455,715 | 5/1923 | Danese | 242/107.12 |
| 2,052,341 | 8/1936 | Douglass | 242/107.11 |

FOREIGN PATENT DOCUMENTS 166920  1/1934  Switzerland .................. 242/107.11

Primary Examiner—John M. Jillions

Attorney, Agent, or Firm—Frank J. Dykas; Craig M. Korfanta; Ken J. Pedersen

[57] ABSTRACT

A dual take-up reel device (10) is disclosed which includes a dual reel spool assembly (27) having a pair of winding hubs (29) axially secured together and separated by a main spool disc (28). An arcuate cord slot (31) is provided in main spool disc (28) for centrally attaching a flat tape cord (11) around winding hubs (29). Dual reel spool assembly (27) is rotatably held and encased by first and second main housing halves (13) and (19). The two ends of flat tape cord extend outward from the housing through first and second cord slots defined by first and second cord slot defining notches 59a and 59b and 60a and 60b. A flat coil spring (48) is attached within its own casing and between dual reel spool assembly (27) and second main housing house (19) via spring locking key (51) and radially biases dual reel spool assembly (27) about its axis to retract any slack in flat tape cord (11) into the housing and around the reels on dual reel spool assembly (27).

3 Claims, 6 Drawing Sheets

DUAL REEL CORD TAKE-UP DEVICE

BACKGROUND OF THE INVENTION

1. Technical Field

This invention generally relates to take-up devices for electrical cords, and specifically it relates to a take-up device for flat tape like conductors such as telephone cords.

2. Background Art

U.S. Pat. No. 4,646,987, to Edwin R. Peterson a co-inventor of the instant invention, discloses a single reel take-up device for connecting a telephone and a cooperating handset which has become quite popular. This device provides an adjustable length cord, up to approximately six feet in length, between the handset and the telephone. However, recently there have been numerous requests for an even longer version. Simply adding length to the previous version requires that the diameter of the take up reel be increased in order to accommodate the additional length. Additionally, the corresponding tension on the coil has to be increased to retract the additional cord. Increasing the reel dimension results in a dramatic increase in the overall dimensions of the device, and in fact, the device becomes too large to be practical. An additional drawback to the previous version is that it is comparatively complex and expensive to manufacture and assemble, requiring either gluing or ultrasonic welding in the case of the plastic housing which is how it is currently produced.

Therefore, what is needed is a cord take-up device which is capable of accommodating a much greater length of cord, without sacrificing compactness, and which is simpler and more cost efficient to manufacture.

Accordingly, it is an object of the instant invention to provide a compact cord take-up device which is capable of retrieving and storing a greater length of cord than was previously possible. An additional object of the instant invention is to provide a cord take-up device which is more cost efficient to manufacture by eliminating the need for gluing or ultrasonic welding.

DISCLOSURE OF INVENTION

These and other objects are accomplished by a dual reel cord take-up device which is completely manufactured from a self-lubricating plastic, with the exception of the coil spring, and whose parts are designed to securely and permanently snap together without the use of glue or ultrasonic welding. The instant device includes a totally encased coil spring to make the spring more efficient by reducing the amount of friction to which the spring is subjected and to reduce the amount of audible noise produced by the coiling spring.

The instant invention has a dual reel assembly rotatably secured within a snap together housing. The housing includes two slots through which a flat tape type cord passes. The cord is centrally attached between the two take-up reels to divide the cord into two portions. Each portion is spirally wrapped around one of the reels of the dual reel assembly. The encased coil spring radially biases the dual reel assembly within the housing in a direction to rotationally urge the spool assembly to wind the cord onto the reels. The cord is prevented from being wound totally into the housing by electrical connecters, which in the case of a telephone cord are standard modular telephone jacks.

A spring locking key is inserted through the housing and engages an inner end of the coil spring to lock it into a fixed position with respect to the housing. Prior to final assembly, the spring locking key is rotated with the spring engaged to pretension the spring.

Thus, a cord take-up device is provided which travels along the length of the cord and maintaining a substantially equal distant position from both ends of the cord. The device will automatically retract any slack in the cord, thereby providing an adjustable length cord connection between two objects.

BEST MODE FOR CARRYING OUT INVENTION

Figure 1:
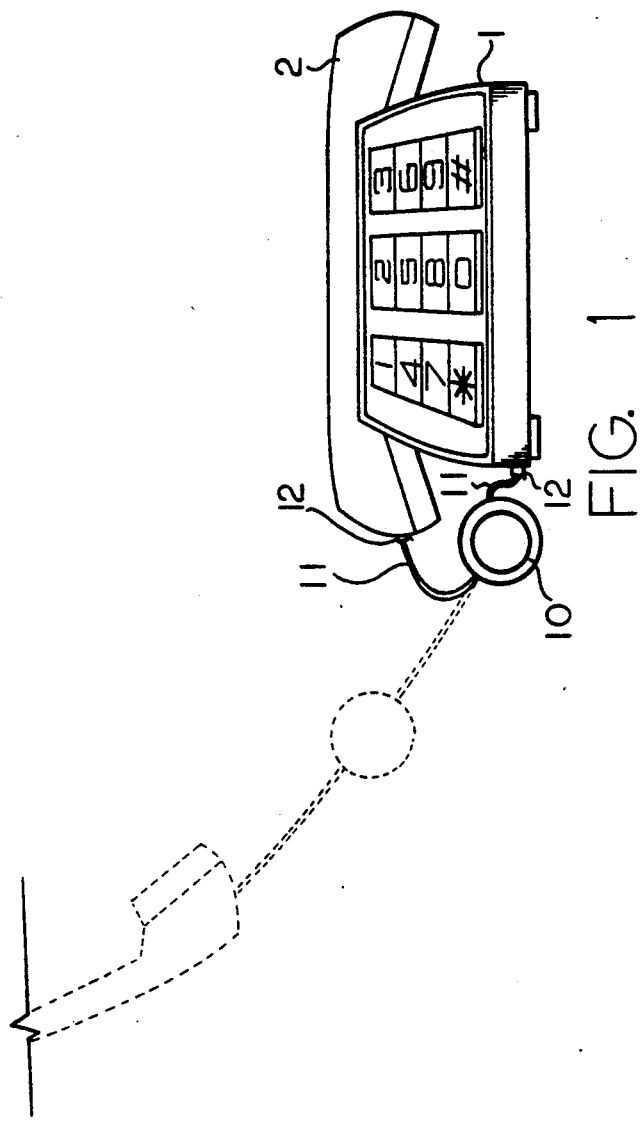
FIG. 1 is a front elevation view of a telephone equipped with a dual reel cord take-up device.
Figure 2:
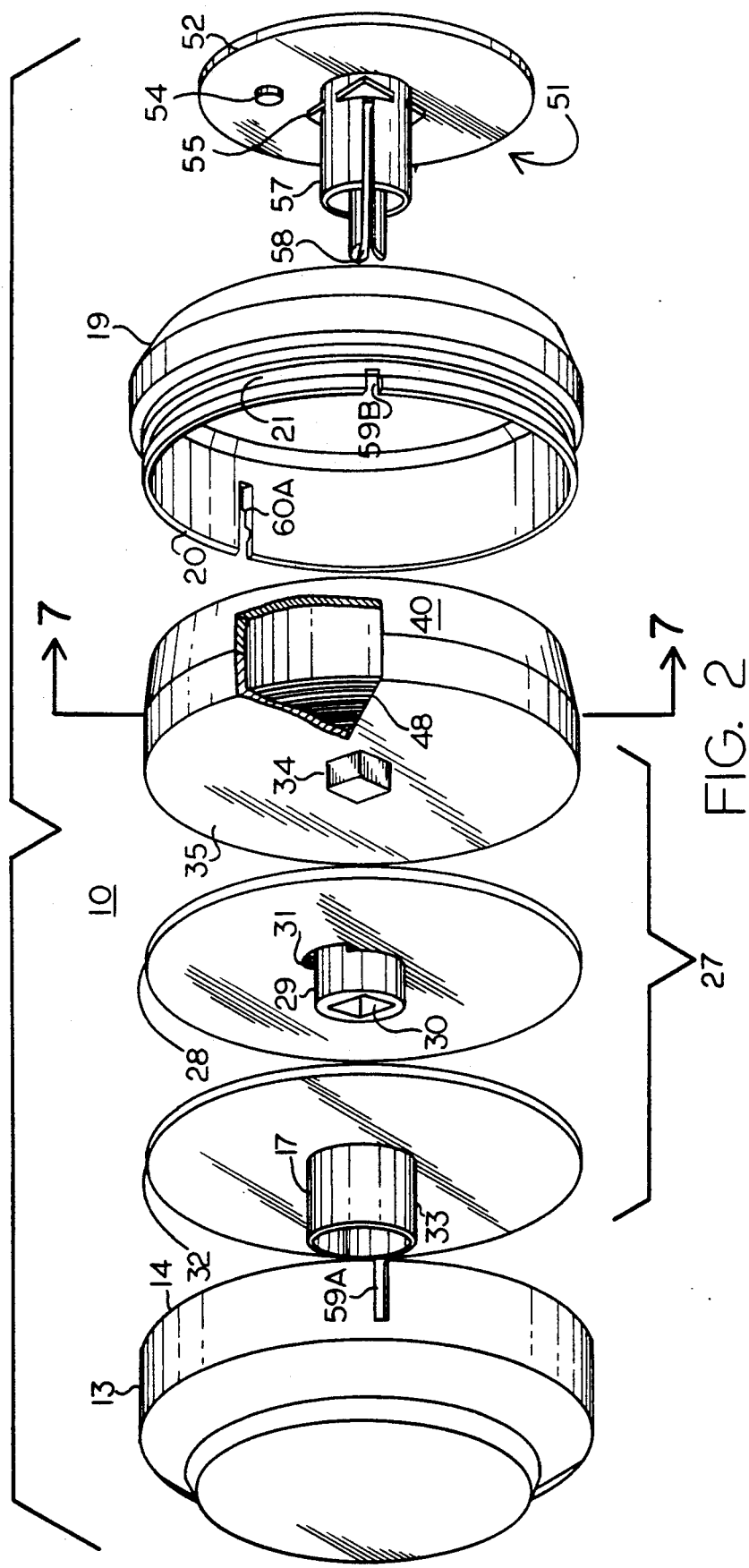
FIG. 2 is an exploded perspective view of the cord take-up device with the cord omitted for the purpose of illustration.
Figure 3:
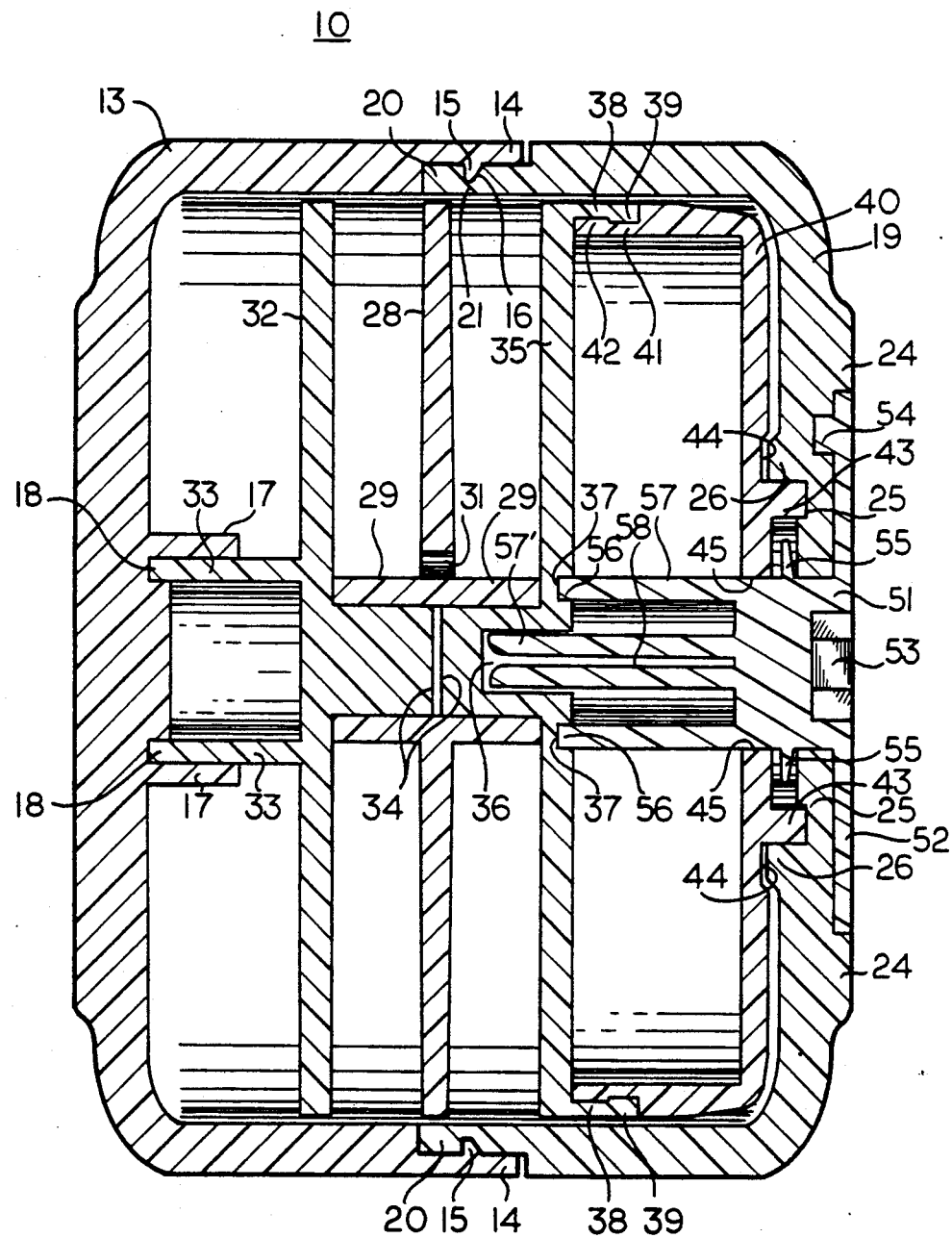
FIG. 3 is a side sectional view of the cord take-up device taken along a plane containing the axis of rotation of the spring and having the cord and coil spring omitted for the purpose of illustration.
Figure 5:
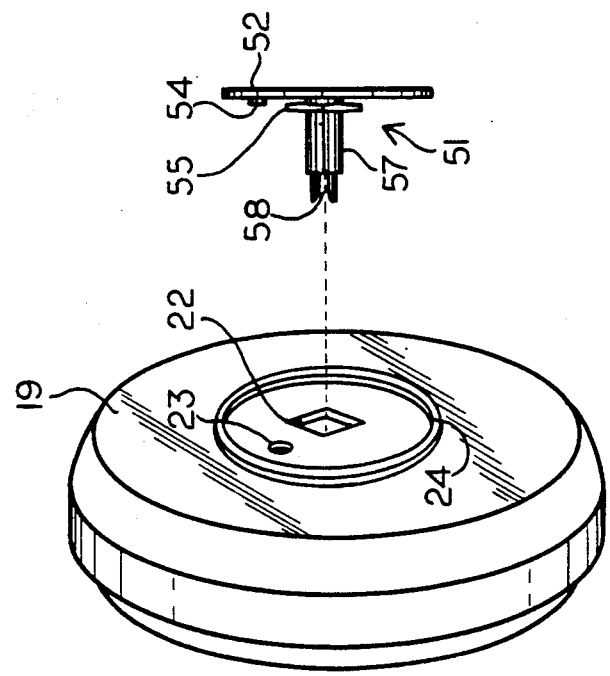
FIG. 5 is a side perspective view of the main spring housing and the spring locking key.
Figure 4:
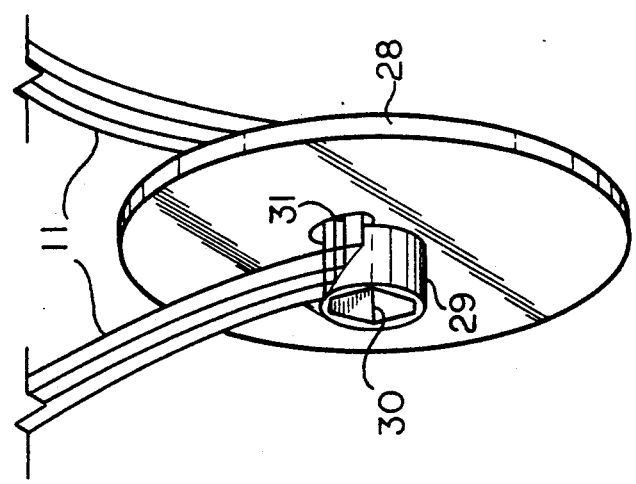
FIG. 4 is a side perspective view of the main spool disc having the flat telephone cord installed thereon.
Figure 6:
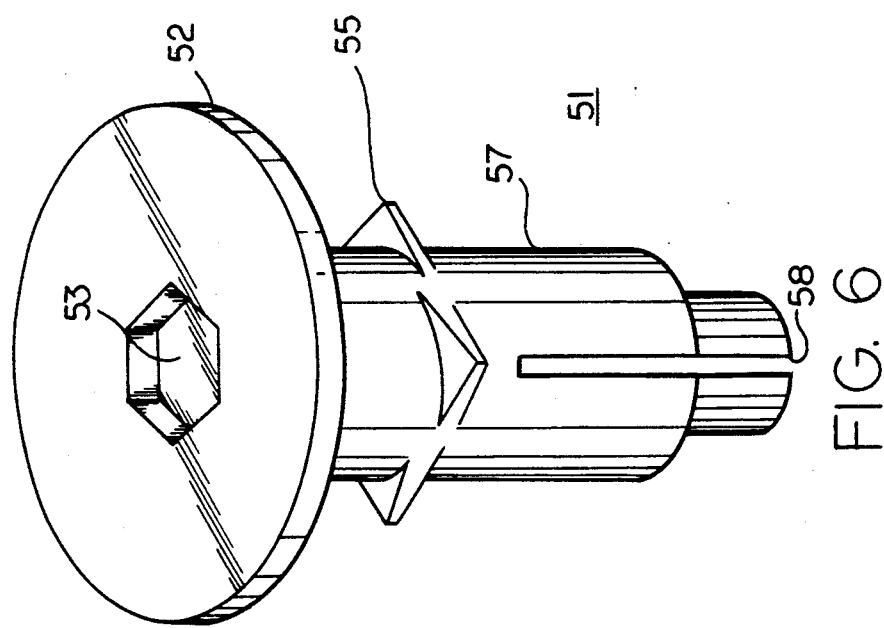
FIG. 6 is a perspective view of the spring key lock.
Figure 7:
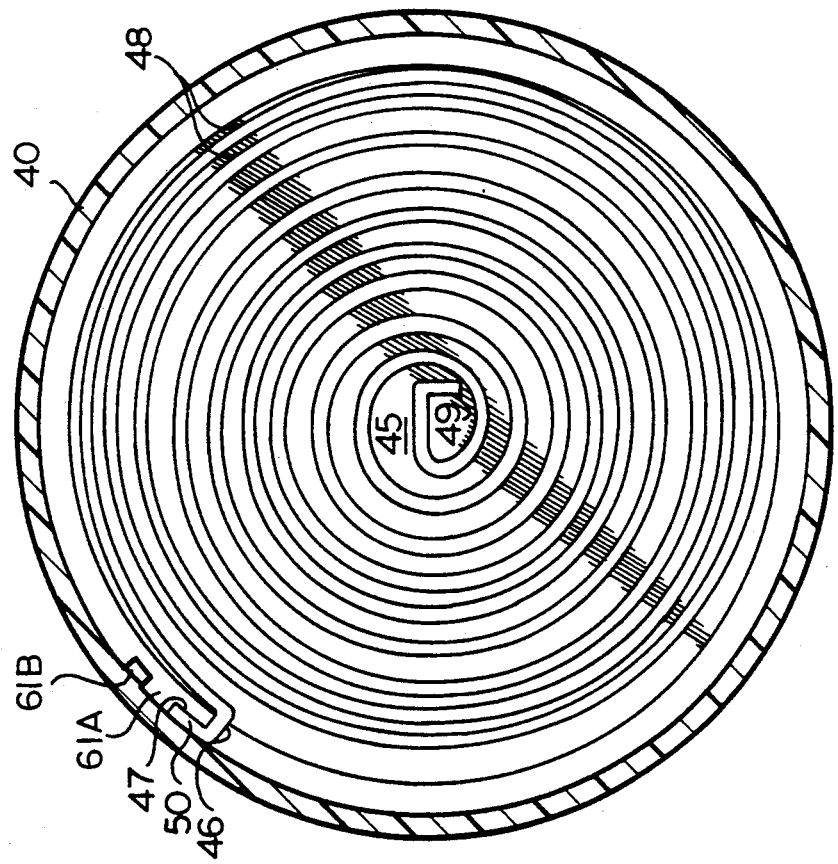
FIG. 7 is a side sectional view of the coil spring encasement having the coil spring installed therein, taken along section line 7 of FIG. 3.

Referring now to FIG. 1, a conventional telephone 1 is shown having handset 2 being electrically connected by length of flat tape cord 11. Flat tape cord 11 has a first and second end, each having attached thereto a standard modular telephone jack 12 for connecting flat tape cord 11 between telephone 1 and handset 2. As will be hereinafter described, a dual reel cord take-up device 10 is centrally attached on the elongated length of flat tape cord 11 to provide an adjustable length connection between handset 2 and telephone 1.

Also referring now to FIGS. 2 through 7, dual reel cord take-up device 10 will be explained in detail. As preliminary background information relating to the construction of dual reel cord take-up device 10, the housing of the device is manufactured from a high impact plastic, such as ABS (acrylonitirile butadiene styrene) while the inner workings are manufactured from a silicone treated acetal plastic to be self lubricating, with the exception of flat coil spring 48, which is here manufactured from a flat steel band. The plastic portions of dual reel take-up device 10 are injection molded and designed to provide a permanent snap together assembly which does not require gluing or ultrasonic welding for production. This is done to lower the cost and simplify production of the device.

A first main housing half 13, is formed in the shape of a cylindrical cap which includes an inner surface and an outer surface. A first extending cylindrical wall portion 14 extends annularly upward around the marginal edge of the opening of first main housing half 13. A first annular retaining ridge 15 circumvolves the inner surface of first extending cylindrical wall portion 14 and has a beveled leading edge 16 to facilitate a one way engagement of first annular retaining groove 21 on second main housing half 19. A cylindrical spacer bearing retaining wall 17 is axially attached and extends upward from the inner surface of first main housing half 13 and has a cylindrical spacer bearing retaining groove 18 concentrically disposed within its perimeter.

A second main housing half 19 is similarly formed in the shape of a cylindrical cap and has both inner and outer surfaces. A second extending cylindrical wall portion 20 extends upward from the inner marginal edge of the opening of second main housing half 19 to frictionally engage first extending cylindrical wall portion 14 on first main housing half 13. A first annular retaining groove 21 circumscribes the outer surface of the second extending cylindrical wall portion 20 and is sized and shaped to closely receive first annular retaining ridge 15 on first extending cylindrical wall portion 14. This particular configuration of frictional engagement and configuration of housing halves 13 and 19 provides a snap together housing assembly which becomes relatively permanent once the housing halves are snapped together. First and second pairs of cord portion slot defining notches 59a, 59b and 60a, 60b, are provided in the first extending cylindrical wall portion 14 and second extending cylindrical wall portion 20 such that when first main housing house 13 and second main housing half 19 are snapped together, notches 59a, 59b, 60a and 60b define a first slot for receiving and passing a first end of flat tape cord 11 and a second slot for receiving and passing a second end portion of flat tape cord 11. First and second cord portion slots are each positioned in alignment with one of the dual reels on dual reel spool assembly 27 for guiding the cord portions into and out of the housing.

Second main housing half 19 is provided with a square locking key hole 22 axially centered in its cap end. A locking pin hole 23 is disposed adjacent to square locking key hole 22 in a predetermined radial position with respect to square locking key hole 22. An annular locking key boss 24 is formed on the outer surface of second main housing half 19 and axially circumscribes square locking key hole 22. A spring housing bearing groove 25 is formed on the inner surface of second main housing half 19 and similarly axially circumscribes square locking key hole 22. A spring housing bearing boss 26 is also formed on the inner surface of second main housing half 19 and axially circumscribes spring housing bearing groove 25.

A dual reel spool assembly 27 is rotatably attached within first and second main housing halves 13 and 19 to carry flat tape cord 11. Dual reel spool assembly 27 is radially biased about its axis by flat coil spring 48, which will be described in detail later. Dual reel spool assembly 27 has a first main spool disc 28 axially connected to a first side spool disc 32 and a second side spool disc 35. A pair of cylindrical winding hubs 29 are axially attached to each side of the main spool disc 28 to provide a surface around which flat tape cord 11 can be wound. An angular through hole 30 is provided in cylindrical winding hubs 29 and through main spool disc 28. Main spool disc 28 acts as a partition dividing spool assembly 27 into its dual reels. An arcuate cord slot 31 is radially disposed within main spool disc 28 to provide a means for centrally attaching flat tape cord 11 to winding hubs 29. Additionally, main spool disc 28 is formed to have a slight taper such that the cross sectional dimension at its marginal annular edge is thinner than the cross sectional dimension at the connection between cylindrical winding hubs 29. This helps to promote efficient winding of flat tape cord 11 onto winding hubs 29 by reducing frictional engagement with the reel side walls, thus preventing the cord from binding between the side walls.

A first side spool disc 32 is axially attached to main spool disc 28 via an angular hub stub 34 on one of its sides. Angular hub stub 34 is sized and shaped to frictionally engage angular through hole 30 in a first cylindrical winding hub 29. A main cylindrical spacer bearing 33 is axially attached to the other side of first side spool disc 32 and slidably and rotationally engaging cylindrical spacer bearing retaining wall 17 and cylindrical spacer bearing retaining groove 18, both of which are on the inner surface of first main housing half 13.

The second side spool disc 35 is attached to the other side of main spool disc 28 using a second angular hub stub 34. The second angular hub stub 34 is identically attached to a first side of second side spool disc 35 and is sized and shaped to engage the other angular through hole 30 in a second cylindrical winding hub 29. A cylindrical key receiving bore 36 and concentric key receiving groove 37 are axially formed in a second side of second side spool disc 35 to rotationally and slidably receive the spring locking key 51.

Second side spool disc 35 also forms a first portion of a spring housing which encases flat coil spring 48. This spring housing acts to frictionally isolate flat coil spring 48 from second main housing half 19, providing more efficient and quieter operation. An annular spring housing wall portion 38 is attached and extends up from the marginal edge of the side of second side spool disc 35 which contains cylindrical key receiving bore 36 and concentric key receiving groove 37. Annular spring housing wall portion 38 has a third annular retaining ridge 39 formed thereon and circumvolving its inner surface.

A main spring housing 40, again formed in a cylindrical cap shape, has a third extending cylindrical wall portion 41 sized and shaped for frictional engagement with annular spring housing wall portion 38. A fourth annular retaining ridge 42 is attached to and circumscribes the outer surface of third extending cylindrical wall portion 41 to cooperate with third annular retaining ridge 39. Additionally, a pair a spring housing locking keys and key slots 61a and 61b are formed within annular spring housing wall portion 38 and third extending cylindrical wall portion 41 and act to positively couple the spring housing halves together. Further, housing 40 includes an annular groove 44 in slidable and rotational engagement with bearing boss 26, and a cylindrical spacer bearing 43 received in and rotationally engaging bearing groove 25 of housing half 19.

Third extending cylindrical wall portion 41 additionally has a radially disposed spring housing retaining slot 46 therethrough and a spring retaining recess 47 adjacent to the spring housing retaining slot 46 on the outer surface of third extending cylindrical wall portion 41. A second outer end 50 of flat coil spring 48 is bent over on itself and formed in the shape of a hook to engage spring retaining slot 46 and spring retaining recess 47. In this manner, when main spring housing 40 is snapped onto second side spool disc 35 into the annular spring housing wall portion 38, a portion of second outer end 50 is frictionally held between the outer surface of spring retaining recess 47 and the inner surface of annular spring housing wall portion 38 to lock flat coil spring 48 into place. A first inner end 49 of flat coil spring 48 is positioned diametrically within the perimeter of the annular locking key hole 45 in main spring housing 40.

Spring locking key 51 is then inserted through square locking key hole 22 and annular locking key hole 45. Spring locking key 51 has an annular retaining flange 52 radially attached to a first end. An angular winding recess 53 is axially formed within the outer surface of annular retaining flange 52 while a locking pin 54 is attached to and extends outward from an inner surface of annular retaining flange 52. Locking pin 54 is radially positioned away from the axis of annular retaining flange 52. A cylindrical spring hub 57 is axially attached to the inner surface of annular retaining flange 52 and has a cylindrical bearing surface 56 at one end thereof. A center axle stub 57' is coaxially attached to and extends axially out from the cylindrical spring hub 57. A spring engagement slot 58 is disposed diametrically within and through the cylindrical spring hub 57 and the center axle stub 57' for receiving and frictionally engaging a first inner end 49 of flat coil spring 48. Once spring engagment slot 58 is engaged with first inner end 49 of flat coil spring 48, the extreme most end of center axle stub 57' is slidably and rotationally engaged with cylindrical key receiving bore 36 and second side spool disc 35. Additionally, the extreme most end of cylindrical bearing surface 56 slidably and rotationally engages concentric key receiving groove 37. Cylindrical spring hub 57 acts as both a spring winding hub, about which flat coil spring 48 is tensioned and as a rotational and slidable bearing surface against which the annular locking key hole 45 can be engaged. Two pairs of right triangular locking dogs 55 are radially and diametrically attached around cylindrical bearing surface 56, disposed in spaced relation to annular retaining flange 52 such that the outer perimeter which is formed by locking dogs 55 is sized to be closely received by square locking key hole 22. Once spring locking key 51 is inserted through square locking key hole 22 and locking dogs 55 also pass through a square locking key hole 22, spring locking key 51 can be rotated one eighth of a turn to engage locking pin 54 and locking pin hole 23. A slight bevel is provided to the top surface of locking dogs 55 to promote close frictional engagement of the locking dogs with the inner surface of second main housing half 19.

The dual reel cord take-up device 10 is assembled in the following order. First flat tape cord 11 is inserted through arcuate cord slot 31 on main spool disc 28. The first side spool disc 32 is then attached to a first side of main spool disc 28 by engaging angular hub stub 34 in the angular through hole 30 in a first cylindrical winding hub 29. A second side spool disc 35 is then attached to a second side of main spool disc 28 by engaging its angular hub stub 34 in angular through hole 30 on the second cylindrical winding hub 29. Flat tape cord 11 is centered within arcuate cord slot 31 to form first and second half portions of the cord. Each half portion is then wound around one of the dual reels and dual reel spool assembly 27. Flat coil spring 48 is then installed within main spring housing 40 by engaging its second outer end 50 in spring retaining recess 47 and spring housing retaining slot 46. Main spring housing 40 is then snapped onto first side spool disc 32 by aligning spring housing locking keys and key slots 61a and 61b and pressing main spring housing 40 into annular spring housing wall portion of 38, thereby engaging third annular retaining ridge 39 and fourth annular retaining ridge 42. The dual reel spool assembly 27 and attached coil spring encasement are then positioned in first main housing half 13 by engaging main cylindrical spacer bearing 33 in cylindrical spacer bearing retaining wall 17 and cylindrical spacer bearing retaining groove 18. The second main housing half 19 is then snapped into first main housing half 13 by engaging second extending cylindrical wall portion 20 and first annular retaining groove 21 with first extending cylindrical wall portion 14 and first annular retaining ridge 15. In doing so, a first end of flat tape cord 11 is positioned between first cord slot defining notches 59a and 59b. Identically a second end of flat tape cord 11 is positioned between second cord portion slot defining notches 60a and 60b. Standard modular phone jacks 12 are then attached to each end of flat tape cord 11. Spring locking key 51 is then inserted through square locking key hole 22 and annular locking key hole 45 with spring engagement slot 58 engaging the first inner end 49 of flat coil spring 48. Before spring locking key 51 is completely inserted into its final position, a temporary shim is placed between the inner surface of annular retaining flange 52 and the outer surface of second main housing half 19. The temporary shim allows spring locking key 51 to be rotated to pre-tension flat coil spring 48. Once flat coil spring 48 has a sufficient number of turns to provide ample tension on the spring for biasing dual reel spool assembly 27, the shim is withdrawn and locking pin 54 is allowed to engage locking pin hole 23. In so doing, locking dogs 55 are rotated 45° out of alignment with respect to the corners of square locking key hole 22 thereby engaging the upper surfaces of locking dogs 55 with the inner surface of second main housing half 19. The outer surface of annular retaining flange 52 then occupies a position flush with annular locking key boss 24 to prevent spring locking key 51 from being disengaged from the assembly and to provide a finished appearance to the device.

While there is shown and described the present preferred embodiment of the invention, it is to be distinctly understood that this invention is not limited thereto but may be variously embodied to practice within the scope of the following claims.

Accordingly what is claimed is:

1. A dual reel cord take-up device for retrieving and storing flat tape cord having a first end and a second end, which comprises:

a first main housing half formed in the shape of a cylindrical cap having an inner surface and an outer surface;

said first main housing half having a first extending cylindrical wall portion including a first annular retaining ridge circumvolving an inner surface of said first extending wall portion;

a cylindrical spacer bearing retaining wall being concentrically attached to and extending from the inner surface of said first main housing half;

said first main housing half inner surface having a cylindrical spacer bearing retaining groove concentrically disposed therein;

a second main housing half formed in the shape of a cylindrical cap having an inner and an outer surface;

said second main housing half having a second extending cylindrical wall including a first annular retaining groove circumscribing an outer surface of said second extending cylindrical wall and being sized for and in engagement with said first annular retaining ridge;

said second main housing half further having a square locking key hole being centrally disposed therein and a locking pin hole being adjacent to said locking key hole;

said second main housing half further having a spring housing bearing groove in its inner surface circumscribing the square locking keyhole and a spring housing bearing boss extending therearound;

a dual reel spool assembly comprising:

a main spool disc having a pair of cylindrical winding hubs being axially attached to and extending from each side thereof;

each of said winding hubs having an angular through hole therethrough;

said main spool disc having an arcuate cord slot therethrough for attaching said flat tape cord at a point halfway in between its first and second ends to said main spool disc;

a first side spool disc having a main cylindrical spacer bearing axially attached to and extending from a first side and being in slidable and rotatable engagement with said cylindrical spacer bearing retaining wall and said cylindrical spacer bearing retaining groove;

an angular hub stub being axially attached to and extending from a second side of said first side spool disc and being in frictional engagement with a first angular through hole in one of said cylindrical hubs;

a second side spool disc having a marginal edge and a cylindrical key receiving bore axially disposed on a first side;

said first side of said second side spool disc having a concentric key receiving groove therein which circumscribes said cylindrical key receiving bore;

an annular spring housing wall portion being attached around and extending from the marginal edge of said second side spool disc;

a third annular retaining ridge being attached to and circumvolving an inner surface of said annular spring housing wall portion;

a main spring housing formed in the shape of a cylindrical cap and having an outer surface;

said main spring housing having a third extending cylindrical wall including a fourth annular retaining ridge circumscribing an outer surface thereof and being in locked engagement with said annular spring housing wall portion and said third annular retaining ridge;

said main spring housing further having a spring housing cylindrical spacer bearing axially attached to and extending from the outer side of said main spring housing being in rotatable and slidable engagement with said spring housing bearing groove;

said main spring housing further having a spring housing bearing boss groove in its outer surface circumscribing said spring housing cylindrical spacer bearing and being in slidable and rotational engagement with said spring housing bearing boss;

said main spring housing further having an annular locking key hole axially disposed within said spring housing cylindrical spacer bearing;

said third extending cylindrical wall having a spring retaining slot therein and a spring retaining recess thereon for receiving and retaining one end of a flat coil spring;

a flat coil spring having a first inner end and a second outer end wherein said second outer end is engaged within said spring retaining slot and said spring retaining recess;

a spring locking key having an annular retaining flange including an outer surface having an angular winding recess axially disposed thereon and an inner surface having a locking pin attached thereto and being in frictional engagement with said locking pin hole in said second main housing half;

said spring locking key having a cylindrical spring hub being axially attached to and extending from its second side;

said cylindrical spring hub having a plurality of locking dogs being radially attached thereto in spaced relation to said annular retaining flange and in frictional engagement with the inner side of said second main housing and having a cylindrical bearing surface in slidable and rotational engagement within the concentric key receiving groove in said second side spool disc;

said cylindrical spring hub further being in slidable and rotational engagement within the annular locking key hole in said second main housing;

a center axle stub being coaxially attached to and extending out from said cylindrical spring hub and being in slidable and rotational engagement with the cylindrical key receiving bore in said second side spool disc; and said center axle stub and said cylindrical spring hub having a diametrically disposed spring engagement slot therethrough being frictionally engaged with the first inner end of said flat coil spring for holding the same under tension and radially biasing said dual reel spool assembly about its axis.

2. A cord take-up reel device which comprises:

a dual reel spool assembly having a pair of winding hubs axially secured together and separated by a center partition;

cord attachment means for attaching a cord between said winding hubs;

a cord, having a first end and a second end, being centrally attached therebetween by said cord attachment means to define two cord portions, each being wound around one of said hubs;

a main housing encasing and rotatably holding said spool assembly;

said main housing having passage means for receiving and passing said first and second cord portions therethrough; and spring biasing means for radially biasing said spool assembly about its axis with respect to said main housing, said biasing means comprising:

a flat coil spring having a first inner end and a second outer end, said second outer end being attached to said spool assembly, and said first inner end being attached to a spring locking means, said spring locking means comprising:

a locking key hole in a spring housing;

a locking key receiving bore and a concentric locking key receiving groove in said spool assembly;

a spring locking key comprising;

an annular retaining flange;

a cylindrical spring hub axially attached to the inner surface of said annular retaining flange;

a center axle stub coaxially attached to and extending out from said cylindrical spring hub;

a spring engagement slot disposed diametrically within and through said cylindrical spring hub and center axle stub for receiving and frictionally engaging the first inner end of said flat coil spring; and said cylindrical spring hub having a cylindrical bearing surface at one and thereof received in and rotationally engaging the concentric locking key receiving groove, the cylindrical spring hub at the other end thereof being received in and in slidable engagement with said locking key hole and the center axle stub being received in and in rotational engagement with said locking key receiving bore.

3. The cord take-up device of claim 2, wherein said cord attachment means is defined by a slot in said partition for receiving and holding said cord at an approximate center point.

* * * * *